United States Patent [19]

Bissot et al.

[11] Patent Number: 4,770,757

[45] Date of Patent: Sep. 13, 1988

[54] EDGE REINFORCEMENT OF MEMBRANES FOR CHLOR-ALKALI CELLS

[75] Inventors: Thomas C. Bissot, Newark; James T. Keating, Wilmington, both of Del.

[73] Assignee: E. I. Du Pont de Nemours and Company, Wilmington, Del.

[21] Appl. No.: 21,269

[22] Filed: Mar. 3, 1987

[51] Int. Cl.$^4$ .............................................. C25B 13/00
[52] U.S. Cl. .................................... 204/296; 156/315; 156/334; 204/98; 204/128; 204/283
[58] Field of Search ................ 156/334, 315; 204/296, 204/283, 98, 128

[56] References Cited

U.S. PATENT DOCUMENTS

| | | | |
|---|---|---|---|
| 4,399,009 | 8/1983 | Chisholm | 204/98 |
| 4,437,951 | 3/1984 | Bissot et al. | 204/98 |

FOREIGN PATENT DOCUMENTS

| | | | |
|---|---|---|---|
| 0232124 | 1/1961 | Australia | 156/315 |
| 0183096 | 6/1987 | European Pat. Off. | 204/296 |

*Primary Examiner*—John F. Niebling
*Assistant Examiner*—Kathryn Gorgos

[57] ABSTRACT

A presoaked perhalogenated polymer cation exchange membrane containing at least one type of acid groups, carboxyl or sulfonyl, is bonded to other articles such as edge-reinforcing tape, gasket, electrolytic cell frame, etc., by means of a pressure-sensitive adhesive material from the group of butyl rubber, styrene-butadiene rubber, and polyacrylate rubber. Presoaking of the membranes is done either in water or in an aqueous alkaline solution.

19 Claims, No Drawings

EDGE REINFORCEMENT OF MEMBRANES FOR CHLOR-ALKALI CELLS

BACKGROUND OF THE INVENTION

This invention relates to a method of bonding an article to a wet perhalogenated polymer cation exchange membrane used in an electrochemical cell or, vice-versa, bonding such a membrane to an article.

The use of ion-permeable membranes in electrochemical cells, especially in chlor-alkali cells, is well known. In the present industrial practice, brine is electrolyzed to sodium hydroxide and chlorine in cells in which the electrodes are separated by a membrane which allows the cations and the anions to migrate to their respective electrodes while preventing undesirable ion migration and molecular migration. The most recently introduced membranes for chlor-alkali cells are made of a fluorocarbon resin and contain pendant sulfonic acid ($-SO_3H$) and carboxyl ($-COOH$) groups. Those different groups may be located on the same polymer, on different polymers in a blend, or on different polymers forming separate layers, one with pendant $-SO_3H$ groups and the other one with pendant $-COOH$ groups, normally in ionic form, such as, e.g., sodium or potassium salts.

The membranes are clamped within the electrochemical cells in an arrangement which divides each cell into tightly separated compartments, so that there is no physical transport or leakage of the electrolyte from one compartment to the other. Because such tight clamping requires good dimensional stability of the membrane under the operating conditions to avoid wrinkling and folding, the membranes normally are presoaked either in water or in a solution such as aqueous sodium hydroxide or sodium bicarbonate, whereupon they swell and expand to a size which is substantially maintained during the the electrolysis.

However, in their wet swollen condition those membranes do not have as high mechanical strength as in the dry state, and especially do not have good tear strength, so that any cuts or notches on their periphery propagate readily under the usual handling or clamping conditions, thus causing membrane failure with a possible safety hazard and resulting disruption of the operation and economic loss. One important application of this invention is in reinforcing the periphery of the membrane sheet to prevent membrane tearing, especially as a result of notch or cut propagation. Other applications include, e.g., bonding a gasket to the periphery of the membrane or bonding the membrane itself to a supporting frame of metal, plastic, or another material.

SUMMARY OF THE INVENTION

It has now been discovered that a wet perhalogenated polymer cation exchange membrane containing at least one type of acid groups selected from carboxyl and sulfonyl groups, in the form of their alkali metal salts, can be bonded to another article by means of a pressure sensitive adhesive material selected from the group consisting of butyl rubber, styrene-butadiene rubber and polyacrylate rubber, by applying a thin film of the adhesive material to at least one of the surfaces to be bonded, contacting with each other the surfaces to be bonded, and applying sufficient pressure.

DETAILED DESCRIPTION OF THE INVENTION

For edge-reinforcing the membrane, a water-resistant tape is bonded with such adhesive material to the edges of the membrane, either on one side of the membrane sheet or on both sides, so as to leave the active area of the membrane substantially free of tape reinforcement.

While the usual manner of carrying out this feature of the invention would be to tape-reinforce the membrane sheet along the exact edges which normally would be gasketed and clamped for the electrochemical chlor-alkali cell operation, another possible embodiment of the method of this invention would be to tape-reinforce along the edges of a membrane sheet larger than required for mounting within the electrochemical cell, to clamp the membrane sheet within the cell, and then to trim the excess material, including the tape-reinforced edges.

Such tapes can be made of any suitable thin, flexible sheet material, which has a tear strength substantially higher than the strength of the wet membrane material and a sufficient water resistance to maintain strength and tear resistance when wet. Such material may be, and usually will be, a synthetic resin but it also may be paper, cloth, or even metal, or in general any material that satisfies the above requirements. Commercially available plastic resins that can be used for making suitable tapes for this purpose include, for example, ethylene polymers, perfluorinated resins, vinyl resins, cellulose, polyester resins, and polyamide resins. A typical ethylene polymer may be, for example, a homopolymer of ethylene or copolymer of ethylene with propylene or octene. A typical perfluorinated resin may be, for example, polytetrafluoroethylene or a copolymer of tetrafluoroethylene with hexafluoropropylene. A typical vinyl resin may be, for example, plasticized polyvinyl chloride, polyvinylidene chloride, or polyvinyl alcohol. A typical polyester resin may be, for example, oriented polyethylene terephthalate or polybutylene terephthalate.

In another embodiment of the invention, a gasket is bonded to the periphery of the membrane. Such a gasket will normally be made of an elastomer such as, for example, a chloroprene (2-chloro-1,3-butadiene) polymer. Such gaskets are normally used for mounting cation exchange membranes in electrochemical cells to prevent electrolyte leakage from one electrode compartment to the other.

Yet another use of this invention is to bond the membrane directly to the electrolytic cell, especially to the frame customarily used for mounting ion exchange membranes in the cells, which may be made of a variety of materials such as, for example, metals or plastics. The membrane also can be directly bonded in this manner to other articles such as, for example, to a rubber or plastic separator or to a flow distributor, which are customarily used in electrochemical cells.

The method of this invention can be applied to any commercial membrane for use in electrochemical cells.

A "wet" membrane is a membrane that has been presoaked in water or in an aqueous solution of a chemical compound, especially of an alkaline compound, such as an alkali metal hydroxide or carbonate, customarily used for conditioning or expanding cation exchange membranes or for converting nonionic or acidic functional groups of membrane polymer to ionized salt form.

Typically, membranes used in the present invention are prepared from fluorinated polymer which has —COOR or —SO₂X functional groups, where R is lower alkyl and X is F or Cl, and a web of support material.

The polymers used in manufacturing the membranes are of types known in the art. These include fluorinated polymers with pendant side chains containing sulfonic acid or carboxylic acid groups or their derivatives.

The carboxylic polymers have a fluorinated hydrocarbon backbone chain to which are attached the functional groups or pendant side chains, which in turn carry the functional groups. When the polymer is in melt-fabricable form, the pendant side chains can contain, for example,

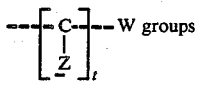

wherein Z is F, CF₃ or CF₂Cl, preferably F; t is 1 to 12 and W is —COOR or —CN, wherein R is lower alkyl. Preferably, the functional group in the side chains of the polymer will be present in terminal

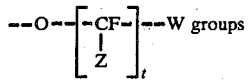

wherein t is 1 to 3.

By "fluorinated polymer" is meant a polymer in which, after loss of any R group by hydrolysis to ion exchange form, the number of F atoms is at least 90% of the total number of F, Cl and H atoms in the polymer. For chloralkali cells, perfluorinated polymers are preferred, though the R in any COOR group need not be fluorinated because it is lost during hydrolysis.

Polymers containing

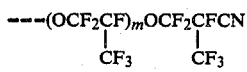

side chains, in which m is 0, 1, 2, 3 or 4, are disclosed in U.S. Pat. No. 3,852,326.

Polymers containing ————(CF₂)ₙCOOR side chains, where n is 1 to 18, are disclosed in U.S. Pat. No. 3,506,635.

Polymers containing

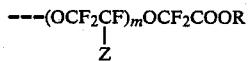

side chains, where Z and R have the meaning defined above and m is 0, 1, or 2 (preferably 1) are disclosed in U.S. Pat. No. 4,267,364.

Polymers containing terminal ———O(CF₂)ᵥW groups, where W is as defined above and v is from 2 to 12, are preferred. They are disclosed in U.S. Pat. Nos. 3,641,104; 4,178,218; 4,116,888; British Pat. No. 2,053,902A; and British Pat. No. 1,518,387. These groups may be part of

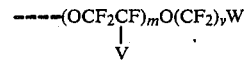

side chains, where V is F, CF₃ or CF₂Cl. Especially preferred are polymers containing such side chains where v is 2, which are described in U.S. Pat. No. 4,138,426 and U.S. Pat. No. 4,487,668, and where v is 3, which are described in U.S. Pat. No. 4,065,366.

Among these polymers, those with m=1, V=CF₃, v=2, and W=COOK are most preferred. Polymers with side chains wherein V is CF₂Cl are disclosed in European patent publication No. 41737.

The above references describe how to make these polymers.

The sulfonyl polymers are fluorinated polymers with side chains containing the group

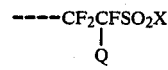

wherein Q is F, Cl, a C₁ to C₁₀ perfluoroalkyl radical, or CF₂Cl, and X is F or Cl, preferably F. Ordinarily, the side chains will contain ————OCF₂CF₂CF₂SO₂X or ————OCF₂CF₂SO₂F groups, preferably the latter. The term "fluorinated polymer" carries the same meaning as employed above in reference to carboxylate polymers. For use in chloralkali membranes, perfluorinated copolymers are preferred.

Polymers containing the side chain

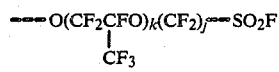

where k is 0 or 1 and j is 3, 4, or 5, may be used. These are described in British Pat. No. 2,053,902A.

Polymers containing the side chain ————CF₂CF₂SO₂X are described in U.S. Pat. No. 3,718,627.

Preferred polymers contain the side chain

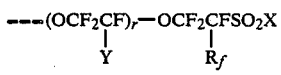

where X is as defined above; Y is F or CF₃; r is 1, 2, or 3; and R_f is F, Cl, or a C₁ to C₁₀ perfluoroalkyl radical, most preferably F, and are described in U.S. Pat. No. 3,282,875. Especially preferred are copolymers containing the side chain

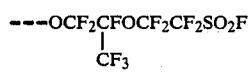

which can be hydrolyzed to ————SO₃K.

Polymerization can be carried out by the methods described in the above references. Especially useful is solution polymerization using ClF₂CCFCl₂ solvent and (CF₃CF₂COO)₂ initiator. Polymerization can also be carried out by aqueous granular polymerization as in U.S. Pat. No. 2,393,967, or aqueous dispersion polymerization as in U.S. Pat. No. 2,559,752 followed by coagulation as in U.S. Pat. No. 2,593,583.

The copolymers should be of high enough molecular weight to produce films which are self-supporting in both the melt-fabricable precursor form and in the hydrolyzed ion exchange form.

These polymers may be fabricated into separate films, but it is also possible to use a laminar film of two or more layers in making the membrane. For example, a film having a layer of a copolymer having sulfonyl groups in melt-fabricable form and a layer of a copolymer having carboxyl groups in melt-fabricable form, such as made by coextrusion, can be used in making the membrane of the invention.

When used as a component of a membrane to separate the anode and cathode compartments of an electrolysis cell, such as a chloralkali cell, the sulfonate polymers, after conversion to ionizable form, should have an equivalent weight in the range of 600 to 1500. Above 1500 the electrical resistivity becomes too high, and below 600 the mechanical and electrochemical properties are poor because of excessive swelling of the polymer. Preferably the equivalent weight is at least 900. Also, for most purposes, and for layers of such polymer of customary thickness, a value no greater than about 1400 is preferred.

For the carboxylate polymers, when used as a component of a membrane to separate the compartments of a chloralkali cell, the requirements thereof differ from those of the sulfonate polymers. The carboxylate polymer should have an equivalent weight in the range of 670 to 1500. A value below 1250 is preferred, so as to have lower resistance. Additionally, a value of at least 770 is preferred, so as to have good mechanical properties.

The multilayer membranes are prepared from component polymer films which have a thickness ranging from as low as about 13 microns (0.5 mil) up to about 150 microns (6 mils). As a multilayer membrane will generally be prepared from two or three such polymer films, the total thickness of polymer films used in making the resulting membrane will generally lie in the range of about 50 to 250 microns (2 to 10 mils), preferably 75 to 200 microns (3 to 8 mils), most preferably about 75 to 150 microns (3 to 6 mils).

For use in ion exchange applications and in cells, for example a chloralkali cell for electrolysis of brine, the membrane should have all the functional groups converted to ionizable functional groups. Ordinarily and preferably these will be sulfonic acid and carboxylic acid groups, most preferably in the form of alkali metal salts thereof. Such conversion is ordinarily and conveniently accomplished by hydrolysis with acid or base, such that the various functional groups described above in relation to the melt-fabricable polymers are converted respectively to the free acids or the alkali metal or ammonium salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethyl sulfoxide in the hydrolysis bath, to swell the membrane to increase the rate of hydrolysis.

The membranes described herein may be modified on the outer surface of the first layer thereof (the surface facing the cathode of a chloralkali cell) so as to have enhanced gas release properties, for example by providing optimum surface roughness, or, preferably, by providing thereon a gas-and liquid-permeable porous non-electrode layer. Such layer may function to facilitate release of hydrogen bubbles, and is sometimes referred to as a hydrogen bubble release layer.

Such a layer can be a non-electrode layer in the form of a thin hydrophilic coating and is ordinarily of an inert electroinactive or non-electrocatalytic substance. Such a non-electrode layer should have a porosity of 10 to 99%, preferably 30 to 70%, and an average pore diameter of 0.01 to 1000 microns, preferably 0.1 to 100 microns, and a thickness generally in the range of 0.1 to 500 microns, preferably 1 to 25 microns. A non-electrode layer ordinarily comprises an inorganic component and a binder; the inorganic component can be of a type as set forth in published UK patent application GB No. 2,064,586A, preferably tin oxide, titanium oxide, zirconium oxide, nickel oxide or an iron oxide such as $Fe_2O_3$ or $Fe_3O_4$. Other information regarding non-electrode layers on ion-exchange membranes is found in published European patent application No. 0,031,660, and in Japanese laid-open patent application Nos. 56-108888 and 56-112487.

Acceptable gas release properties on the outer surface of the first layer of the membrane, the surface facing the cathode of a chloralkali cell, can alternatively be provided by optimizing the roughness of that surface. For best hydrogen release properties, the roughness should be in the range of about 0.5 to 5 microns (20 to 200 microinches). Such a roughened surface can be made by placing the precursor form of the membrane, i.e., that wherein the fluorinated polymer is still in a melt-fabricable form, against a surface having the desired roughness, e.g., a release paper, an abrasive paper or a roughened metal roll, under heat and pressure. More information about suitable techniques can be found in U.S. Pat. Nos. 4,323,434 and 4,272,353.

An electrocatalyst on the outer surface of the first layer of the membrane can also function as a hydrogen bubble release layer to provide for good gas release properties. Such electrocatalyst can be of a type known in the art, such as those described in U.S. Pat. Nos. 4,224,121 and 3,134,697, and published UK patent application GB No. 2,009,788A. Preferred cathodic electrocatalysts include platinum black, Raney nickel, and ruthenium black.

The binder component in a non-electrode layer, or in an electrocatalyst composition layer, can be, for example, polytetrafluoroethylene; a fluorocarbon polymer, at least the surface of which is hydrophilic by virtue of treatment with ionizing radiation in air or a modifying agent to introduce functional groups such as -----COOH or ------SO$_3$H (as described in published UK patent application No. 2,060,703A), or treatment with an agent such as sodium in liquid ammonia; a functionally substituted fluorocarbon polymer or copolymer which has carboxylate or sulfonate functional groups; or polytetrafluoroethylene particles modified on their surfaces with fluorinated copolymer having acid type functional groups (GB Pat. No. 2,064,586A). Such a binder is suitably used in an amount of 10 to 50% by weight or the non-electrode layer, as the case may be or of the electrocatalyst composition layer.

A non-electrode layer can be applied to a membrane by various techniques known in the art, which include preparation of a decal which is then pressed onto the membrane surface, application of a slurry in a liquid composition (e.g., dispersion or solution) of the binder followed by drying, screen or gravure printing of compositions in paste form, hot pressing of powders distributed on the membrane surface, and other methods as set forth in GB Pat. No. 2,064,586A. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form. Similar methods can be used to apply an electrode layer.

When a membrane with an electrode or non-electrode layer on one or both sides is to be used, it is preferred that the coated area be limited, as by the use of masking tape, so that no coating is present in the area to be adhered.

It is also possible to make a reinforced membrane whose constitution with respect to the fluorinated ion-exchange polymer thereof (or precursor polymer thereof) is either (1) a single layer of polymer whose functional groups are —CFQ—SO$_3$M groups (or —CFQ—SO$_2$X groups) and whose cathode-facing surface has been chemically converted to carboxyl groups, or (2) first and second layers of polymer, both being of polymer whose functional groups are —CFQ—SO$_3$M groups (or —CFQ—SO$_2$X groups), the two layers differing either in equivalent weight only or in chemical composition, with the higher equivalent weight layer of the composition with the lower water absorption forming the first (cathode-facing) layer of the membrane.

Electrochemical cells in which those membranes are used comprise an anode, a compartment for the anode, a cathode, a compartment for the cathode, and a membrane which is situated to separate those two compartments. One example is a chloralkali cell, for which the membrane should have the functional groups in salt form; in such a cell, a layer of the membrane which has the lower absorption, preferably a layer containing carboxylic functional groups, will be disposed toward the cathode compartment.

While the choice of the presoaking liquid is not highly critical, presoaking in an aqueous sodium bicarbonate solution is normally preferred because a membrane presoaked in such a solution does not significantly change its dimension when it is later placed in the chloralkali cell. Membranes presoaked in water change their dimensions to a larger extent under the actual operating conditions. Presoaking in an aqueous sodium hydroxide solution is less desirable because of the corrosive nature of sodium hydroxide, which makes handling less pleasant and potentially more risky. Further, sodium hydroxide has a tendency to weaken the tape-membrane bond.

The best adhesive layer for use with current commercial chlor-alkali cell membranes is butyl rubber. SBR and polyacrylate adhesives also perform quite well, while polyisoprene and polydimethylsiloxane adhesives give the lowest adhesion. The adhesive tapes can be obtained commercially, i.a. from 3M Company and from Johnson & Johnson. However, such prefabricated tapes are not the only type suitable in this invention since the same effect can be obtained by fabricating the tapes in situ, that is, applying a layer of a suitable adhesive composition to the edges of a chlor-alkali cell membrane and then covering the adhesive with a strip of plastic material. For the purposes of this invention, both approaches are equivalent and are intended to be included within the broadest scope of the claims appended hereto. Using such a two-step edge reinforcement method can offer an advantage in that the edge reinforcement can act as a release film when the cell is disassembled.

This invention is now illustrated by the following examples of certain representative embodiments thereof, where all parts, proportions, and percentages are by weight, unless otherwise indicated.

The membrane material used in all the examples is available from the Du Pont Company under the trademark Nafion ® perfluorinated membrane.

Adhesive tapes were commercially available Scotch ® brand products from 3M Company and products from Johnson & Johnson sold under the names "Dermaclear" and "Waterproof". The chemical compositions of the tape base adhesives were determined experimentally by infrared analysis and are believed to be substantially correct.

All test solutions were made using deionized water. Sodium hydroxide and sodium bicarbonate were "A.C.S. Certified" chemicals from Fisher Scientific Co.

Membranes were presoaked at room temperature for at least one hour, except as stated. In most cases, when tape was to be applied, the membrane was removed from the liquid and the surface to be taped was blotted with a paper towel to remove surface liquid. The tape was applied by hand, then rolled on with a 10 cm-wide rubber roller, 2.5 cm in diameter, applying moderate hand pressure. The taped membrane was then replaced in the original liquid or in another liquid, depending on the test.

Adhesion was tested both subjectively and objectively. The subjective tests included visual observation for either complete or partial lift-off of the tape and peeling by hand. The objective tests were machine (Instron ®) shear and 90 peel tests.

The subjective order of the preference of commercial tapes applied to Nafion ® perfluorinated membrane after soaking in a 2% sodium bicarbonate solution is given in Table I, below, on an arbitrary scale of 1 to 10, where 1 is the best tape and 10 the worst. The table also identifies the adhesive base polymer, as determined by infrared. All tapes and their commercial designations other than those identified as Johnson & Johnson (J&J) are 3M Scotch ® brand.

TABLE I

| Tape | Polymer Base | Adhesion |
| --- | --- | --- |
| No. 50 corrosion protection | Butyl rubber | 1 |
| No. 88 vinyl electrical | Butyl rubber | 2 |
| No. 17 vinyl electrical | Butyl rubber | 3 |
| No. 463 Adhesive transfer | Polyacrylate | 4 |
| J&J "Dermaclear" | Polyisoprene and Polyacrylate | 5 |
| J&J "Waterproof" | SBR | 6 |
| No. 300 Paper | Polyisoprene + SBR | 7 |
| No. 854 Polyester film | Polybutadiene | 8 |
| No. 855 Nylon film | Polybutadiene | 8 |
| No. 541 Bottle sealing | Polyisoprene | 9 |
| No. 8401 High Tack Release | Polydimethylsiloxane | 10 |

Generally speaking, adhesion of tapes to water-soaked Nafion ® perfluorinated membrane was better than to sodium bicarbonate-soaked membrane. Adhesion to membrane presoaked in 2% sodium hydroxide was usually poor. However, in most cases where a tape adhered well for 1-2 hours, it maintained adhesion for several days. Table II provides results of typical experimental runs. In all cases the tape was applied to the carboxylate side.

TABLE II

| Example | Tape[a] | Surface[b] | Soak | Adhesion at Time 0 Hr. | 16 Hr. | 2 Days | 5 Days |
|---|---|---|---|---|---|---|---|
| 1 | No. 17 | Wet | NaHCO$_3$[d] | Poor | — | — | — |
| 2 | No. 17 | Dry | NaHCO$_3$[d] | Good | Good | Good | Good |
| 3 | No. 88 | Dry | NaHCO$_3$[d] | Good | Good | Good | Good |
| 4 | No. 88 | Wet | NaHCO$_3$[d] | Poor | — | — | — |
| 5 | No. 463-"FEP"[c] | Dry | NaHCO$_3$[d] | Good | Good | Good | "FEP"[c] Off |
| 6 | No. 17 | Dry | Water | Good | Good | Good | — |
| 7 | No. 18 | Dry | Water | Good | Good | Good | — |
| 8 | No. 463-"FEP"[c] | Dry | Water | Good | Good | Good | — |

[a] See commercial designations in Table I
[b] "Wet" is dripping wet; "dry" is blotted dry
[c] "Teflon" fluorocarbon resin film
[d] 2% solution in water Table III lists the results of four additional experiments. In this case, the tape was applied to both the carboxylate side and the sulfonate side of Nafion ® membrane.

TABLE III

| Example | Tape[a] | Carboxylate Side Wet[b] | Dry[c] | Sulfonate Side Wet[b] | Dry[c] | Time to Failure |
|---|---|---|---|---|---|---|
| 9 | No. 300 | Poor | Good | Poor | Good | None after 16 hrs. |
| 10 | No. 854 | Poor | Good | Poor | Good | Partial adhesion after 16 hrs. |
| 11 | No. 855 | Poor | Good | Poor | Good | Partial adhesion after 16 hrs. |
| 12 | No. 8401 | Poor | Good | Poor | Good | 5 minutes |

[a] See Table I for tape identification
[b] and [c] See Table II, footnote [b] for explanation of terms

EXAMPLE 13

Instead of applying to Nafion ® perfluorinated membrane a preformed tape, tape reinforcement was fabricated in situ by applying to the edges of water-soaked membrane adhesive removed from Scotch ® No. 463 adhesive transfer tape; then a 0.25 mm thick polyethylene film strip or 0.5 mm thick strip of Teflon ® FEP fluorocarbon resin film was applied to the adhesive. The membrane was then returned to the water tank. After four days, both strips remained on the membrane, although polyethylene seemed to adhere more tightly.

EXAMPLE 14

This experiment was run in the same manner as Example 13, except that the soaking liquid was aqueous 2% sodium hydroxide. Only polyethylene film was tested. Adhesion to the membrane was still maintained after one day in the alkaline solution.

EXAMPLES 15-18

Tables IV and V summarize the results of Instron ® tests performed with several adhesive tapes applied to Nafion ® perfluorinated membrane presoaked in a 2% aqueous sodium bicarbonate solution and returned to the same solutions after taping. Tests were performed after the indicated number of hours. The commercial tape designations are the same as in Table I.

TABLE IV

| Example | Scotch ® No. | Side | Shear (kPa) after time Hrs. 2-4 | 24-30 | 72-125 | Rating |
|---|---|---|---|---|---|---|
| 19 | 50 | SO$_3$Na | 77.2 | 86.9 | 60 | Very Good |
|  |  | COONa | 59.3 | 41.4 | 65 |  |
| 20 | 88 | SO$_3$Na | 12.4 | 15.2 | 10.0 | Good |
|  |  | COONa | 41.4 | 38.6 | 25.9 |  |
| 21 | 17 | SO$_3$Na | 17.9 | 24 | 32.1 | Fair |
|  |  | COONa | 25.9 | 24 | 30.1 |  |
| 22 | 463 | SO$_3$Na | <7 | <7 | <7 | Poor |
|  |  | COONa | <7 | <7 | <7 |  |

TABLE V

| Example | Scotch ® No. | Side | 90° C. Peel (N/m) after time Hrs. 2-4 | 24-30 | 72-125 | Rating |
|---|---|---|---|---|---|---|
| 19 | 50 | SO$_3$Na | 105 | 174 | 130 | Very Good |
|  |  | COONa | 93 | 117 | 182 |  |
| 20 | 88 | SO$_3$Na | 44 | 67 | 110 | Good |
|  |  | COONa | 44 | 54 | 88 |  |
| 21 | 17 | SO$_3$Na | — | — | — | Tape width is 1.25 cm |
|  |  | COONa | 26 | 31 | 23 |  |
| 22 | 463 | SO$_3$Na | <10 | <10 | <10 | Very Poor Adhesion |
|  |  | COONa | <10 | <10 | <10 |  |

EXAMPLES 19-22

Table VI and VII summarize the results obtained with a coated Nafion ® perfluorinated membrane. In Example 19, the membrane was coated with zirconium oxide only on the ——————COONa side, while in the other examples it was coated on both sides. In Example 19, tape was applied to both sides of membrane edges, but in Examples 20-22 it was applied to only the —————COONa side. In Example 22, no adhesion of the tape was observed.

TABLE VI

| Example | Scotch ® No. | Side | Shear (kPa) after time Hrs. 2-4 | 24-30 | 72-125 | Rating |
|---|---|---|---|---|---|---|
| 19 | 50 | SO$_3$Na | 7 | 7 | 7 | Very Good |
|  |  | COONa | 69 | 59 | 68 |  |
| 20 | 88 | SO$_3$Na | 52 | 21 | 51 | Good |
|  |  | COONa | — | — | — |  |
| 21 | 17 | SO$_3$Na | 28 | 26 | — | Fair |
|  |  | COONa | — | — | — |  |
| 22 | 463 | SO$_3$Na | — | — | — | Poor |
|  |  | COONa | — | — | — |  |

TABLE VII

| Example | Scotch ® No. | Side | 90° C. Peel (N/m) after time Hrs. | | | Rating |
|---|---|---|---|---|---|---|
| | | | 2–4 | 24–30 | 72–125 | |
| 19 | 50 | SO₃Na | 44 | 18 | — | Very Good |
| | | COONa | 79 | 70 | 133 | |
| 20 | 88 | SO₃Na | 84 | 88 | 91 | Good |
| | | COONa | — | — | — | |
| 21 | 17 | SO₃Na | 48 | 53 | 41 | Fair |
| | | COONa | — | — | — | |
| 22 | 463 | SO₃Na | — | — | — | Poor |
| | | COONa | — | — | — | |

We claim

1. A method of bonding to another article a perhalogenated polymer cation exchange resin wet with water or with an aqueous solution and made of a resin containing at least one type of acid group selected from the group consisting of carboxyl and sulfonyl groups, in the form of their alkali metal salts, said method consisting in applying to at least one of the surfaces to be bonded a thin layer of a pressure-sensitive material selected from the group consisting of butyl rubber, styrene-butadiene rubber, and polyacrylate rubber, contacting the surfaces to be bonded with each other, and applying pressure sufficient to cause bonding of said surfaces to each other.

2. A method of claim 1 wherein the adhesive is applied to the other article.

3. A method of claim 2 wherein the other article is a tape, a rubber gasket, a plastic or metal frame, a rubber or plastic separator, or a flow distributor.

4. A method of claim 3 wherein the other article is a tape and the tape surface to be bonded with an adhesive to the cation exchange resin is made of a material selected from the group consisting of polyethylene, perfluorinated resins, vinyl resins, polyester resins, polyamide resins, and cellulose.

5. A method of claim 1 wherein the adhesive material is applied to the surface of the ion exchange membrane.

6. A method of claim 5 wherein the other article is a tape and the tape surface to be bonded with an adhesive to the cation exchange resin is made of a material selected from the group consisting of polyethylene, perfluorinated resins, vinyl resins, polyester resins, polyamide resins, and cellulose.

7. A method of claim 1 wherein the surface of the cation exchange resin to be bonded to the other article has a coating of another material selected from the group consisting of porous, non-electrode materials and electrocatalyst materials.

8. A method of claim 1 wherein the cation exchange membrane is presoaked in an aqueous sodium hydroxide solution, and surface liquid is removed prior to bonding.

9. A method of claim 1 wherein the cation exchange membrane is presoaked in an aqueous sodium carbonate solution and surface liquid is removed prior to bonding.

10. A method of claim 1 wherein the cation exchange membrane is presoaked in water and surface liquid is removed prior to bonding.

11. A method of claim 1 wherein the cation exchange membrane has both carboxyl and sulfonyl groups.

12. A method of claim 11 wherein the carboxyl and sulfonyl groups are located on opposite surfaces of the membrane, and bonding occurs on at least one surface.

13. A wet perhalogenated polymer cation exchange membrane made of a resin containing at least one type of acid group selected from the group consisting of carboxyl and sulfonyl groups, in the form of their alkali salts, said membrane having another article wet bonded to at least one of the surfaces thereof by means of a pressure-sensitive adhesive material selected from the group consisting of butyl rubber, styrene-butadiene rubber, and polyacrylate rubber.

14. A membrane of claim 13 wherein the article bonded to it is a tape, a rubber gasket, a plastic or metal frame, a rubber or plastic separator, or a flow distributor.

15. A membrane of claim 14 wherein the article bonded to it is a tape, which is made of a material selected from the group consisting of ethylene polymers, perfluorinated resins, vinyl resins, polyester resins, polyamide resins, and cellulose.

16. A membrane of claim 13 wherein the cation exchange resin has both carboxyl and sulfonyl groups.

17. A membrane of claim 15 wherein the carboxyl and sulfonyl groups are located on opposite sides of the membrane.

18. A membrane of claim 13 wherein the surface of the cation exchange membrane to which the other article is bonded has a coating of another material selected from the group consisting of porous, non-electrode materials and electrocatalyst materials.

19. The method of claim 1 wherien the aqueous solution is a solution of an alkaline compound.

* * * * *